Patented Apr. 16, 1929.                                           1,709,454

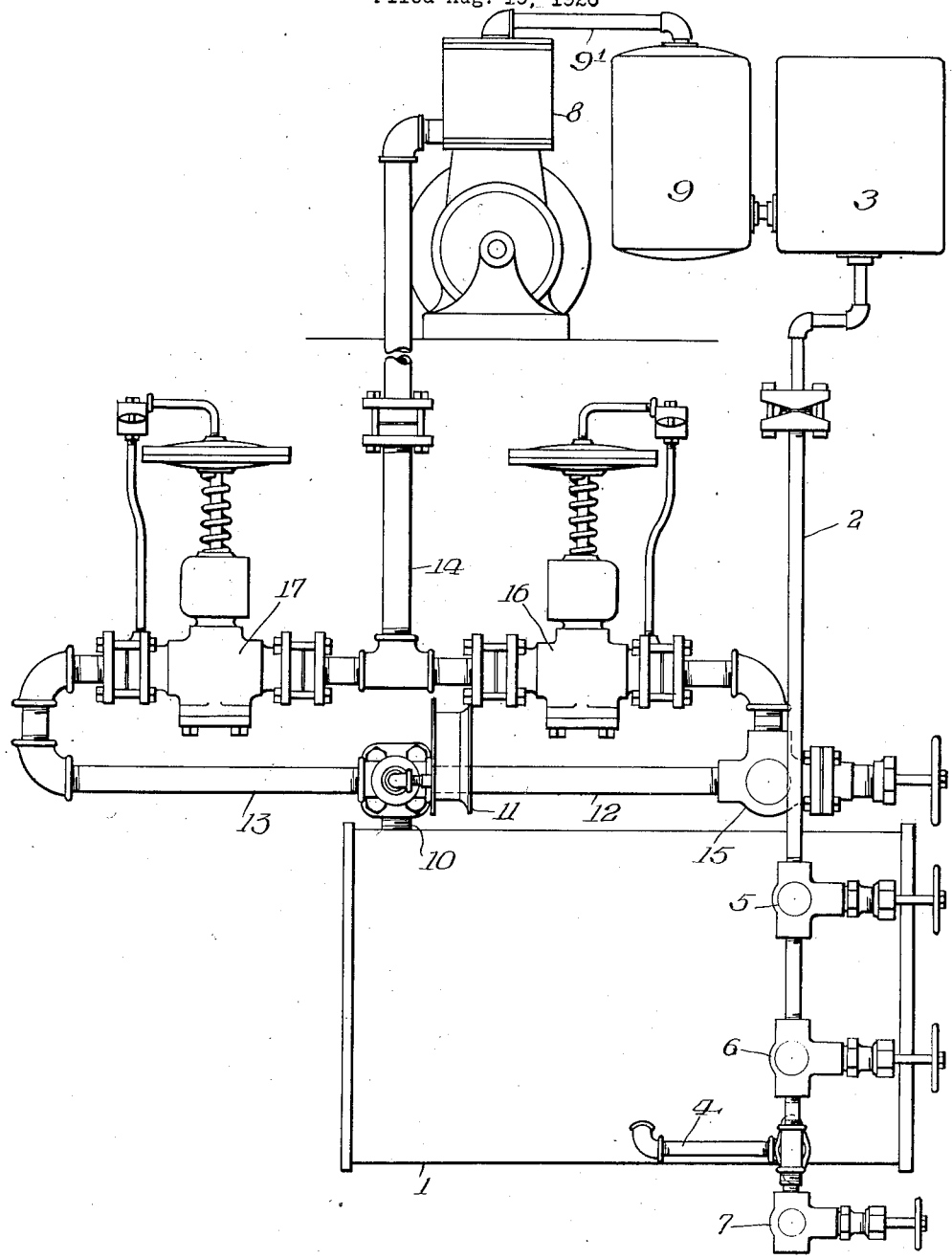

UNITED STATES PATENT OFFICE.

RALPH B. BAGBY, OF CEDAR RAPIDS, IOWA, ASSIGNOR, BY MESNE ASSIGNMENTS, TO CHERRY-BURRELL CORPORATION, OF WILMINGTON, DELAWARE, A CORPORATION OF DELAWARE.

DIRECT-EXPANSION ICE-CREAM FREEZER.

Application filed August 19, 1926. Serial No. 130,117.

This invention relates to direct expansion ice cream freezers in which refrigeration is produced by direct expansion of liquid ammonia in the freezer drum.

The object of the invention is to make a freezer of this type safe to operate, to insure its efficient operation under normal careful conditions and to prevent inefficient operation and liability of accident under indifferent or careless attention.

A further object of the invention is to provide means of simple character whereby a direct expansion ice cream freezer may be set for systematic operation under predetermined conditions to produce desired results, means being provided to maintain these conditions so that the results produced will be uniformly the same.

I have illustrated the invention more or less diagrammatically, and in a simple form, in the accompanying drawing wherein 1 is the freezer drum; 2 is the inlet pipe conducting liquid ammonia from the supply 3 through a branch 4 to the drum 1 and provided with a shut-off valve 5, an expansion valve 6, and a purge valve 7. To freeze ice cream the drum will ordinarily be provided, in the usual manner, with an inner mix or ice cream chamber, surrounded by a refrigerating chamber into which the liquid ammonia is conducted under a predetermined pressure controlled by the expansion valve. In this expansion chamber the liquid ammonia boils under the heat extracted in the refrigerating process and produces the desired refrigerating effect upon the mix to freeze it and produce ice cream. When the liquid ammonia boils it turns into a gas or vapor and is sucked out of the drum by a compressor 8 from which it is discharged to the condenser 9 through the pipe 9'. The gas outlet 10 from the drum is provided with a pressure gauge 11 and two branches 12, 13, both of which are connected with the pipe 14 leading to the compressor. The branch 12 is provided with a shut-off valve 15 and a pressure relief valve 16. The branch 13 is provided with a pressure relief valve 17. The valve 16 is set for relative low pressure, say 15 pounds, and the valve 17 is set for relative high pressure, say 50 pounds.

In the use of my improved apparatus the procedure will ordinarily be as follows:—The shut-off valve 5 being closed, the purge valve 7 being closed, the shut-off valve 15 being open and the relief valves 16, 17 being set at desired pressures, say 15 pounds and 50 pounds, the mix is now placed in the mix chamber in the drum and the drum is closed. Then the expansion valve is set, if it has not been previously set, to reduce the pressure of the liquid ammonia in the line 2 from the supply to a desired pressure, say, 15 pounds. The apparatus is now all set for the refrigerating process to begin, and the shut-off valve 5 is opened. Liquid ammonia flows from the supply through the line 2, is reduced to 15 pounds pressure by the expansion valve 6, and then flows through the branch 4 into the expansion refrigerating chamber of the drum. The liquid ammonia in the expansion chamber boils and is converted into gas or vapor, freezing the mix, and passes out through the outlet 10, branch 12, open shut-off valve 15, and relief valve 16 to the line 14 and thence to the compressor and condenser from which it may pass to a supply tank or directly to the freezer. The relief valve 17 is set at all times at 50 pounds and is always open so that if there is any interruption to the outward flow of the gas through the branch 12 there will always be provision for the outward flow of the gas through the branch 13 when the gas pressure has reached 50 pounds. Thus the relief valve 17 is at all times a safety valve which permits the flow of gas whenever it has reached the 50 pounds pressure. This is important because it is essential that provision should be made for the outflow of gas from the drum to prevent the pressure reaching the danger point. It is often desirable to close the valve 15 to whip the mix for increasing the overrun to the desired proportion, which is an operation well known and commonly practiced in freezing ice cream. When it is desired to whip the mix the valve 15 is closed but the valve 17 permits the outflow of gas whenever it reaches the 50 pounds pressure. If the outlet of gas from the drum is entirely shut-off the pressure may rise to a point where an explosion will result; and this element of danger is constantly present even though gauges and control valves are provided because of inattentiveness or carelessness on the part of operators, and for other reasons; but I provide a safety in the relief valve 17 which does not become operative until the low pressure relief valve 16 is shut-off or becomes inoperative, but is always open and immediately permits the outflow of gas when it has reached a predetermined pressure. It may happen that the operator will undertake to wash and clean the mix chamber without shutting off the valve 5 and emptying the expansion chamber, or he may leave the gas outlet from the drum closed; and in such case the liability of an explosion will be great. But under such conditions, with my invention, the gas outflow can never be completely shut-off because the high pressure side of the outlet is always open at the predetermined pressure. It will thus be apparent that I provide a control in the gas outlet on the low pressure side so that a higher pressure may be maintained in the drum, but I do not provide any control in the gas outflow on the high pressure side and this high pressure outflow thus becomes a safety for the apparatus which prevents the pressure from exceeding that to which the relief valve in the high pressure outflow line is set.

The invention is capable of adaptation to ice cream freezers of different varieties, the drum 1 being here shown in a simple conventional form merely to indicate generally a freezer drum, and the other parts being shown in a more or less diagrammatic form which will be changed as found desirable to meet different conditions and installations, but which will be readily understood by those skilled in the art.

I reserve the right to make all such changes in the construction and arrangement of parts of my invention as may be covered by the following claims.

I claim:

1. A direct expansion ice cream freezer comprising a refrigerating drum, a condenser, means for admitting liquid ammonia to the drum, and means for conducting ammonia gas from the drum to the condenser comprising an outlet having two branches, one branch having a pressure relief valve set relatively low and the other branch having a pressure relief valve set relatively high.

2. A direct expansion ice cream freezer comprising a refrigerating drum, a condenser, means for admitting liquid ammonia to the drum, and means for conducting ammonia gas from the drum to the condenser comprising an outlet having two connecting branches, one branch having a pressure relief valve set relatively low and a shut-off valve between the drum and the pressure relief valve, and the other branch having a pressure relief valve set relatively high with an unobstructed flow from the drum to said pressure relief valve.

3. A direct expansion ice cream freezer comprising a refrigerating drum, a condenser, means for admitting liquid ammonia to the drum, means for conducting ammonia gas from the drum to the condenser at a predetermined pressure, and safety means for conducting the gas from the drum to the condenser at a predetermined higher pressure.

RALPH B. BAGBY.